No. 745,821. PATENTED DEC. 1, 1903.
G. F. GREENWOOD.
CONVEYER.
APPLICATION FILED MAY 19, 1902.
NO MODEL. 4 SHEETS—SHEET 1.
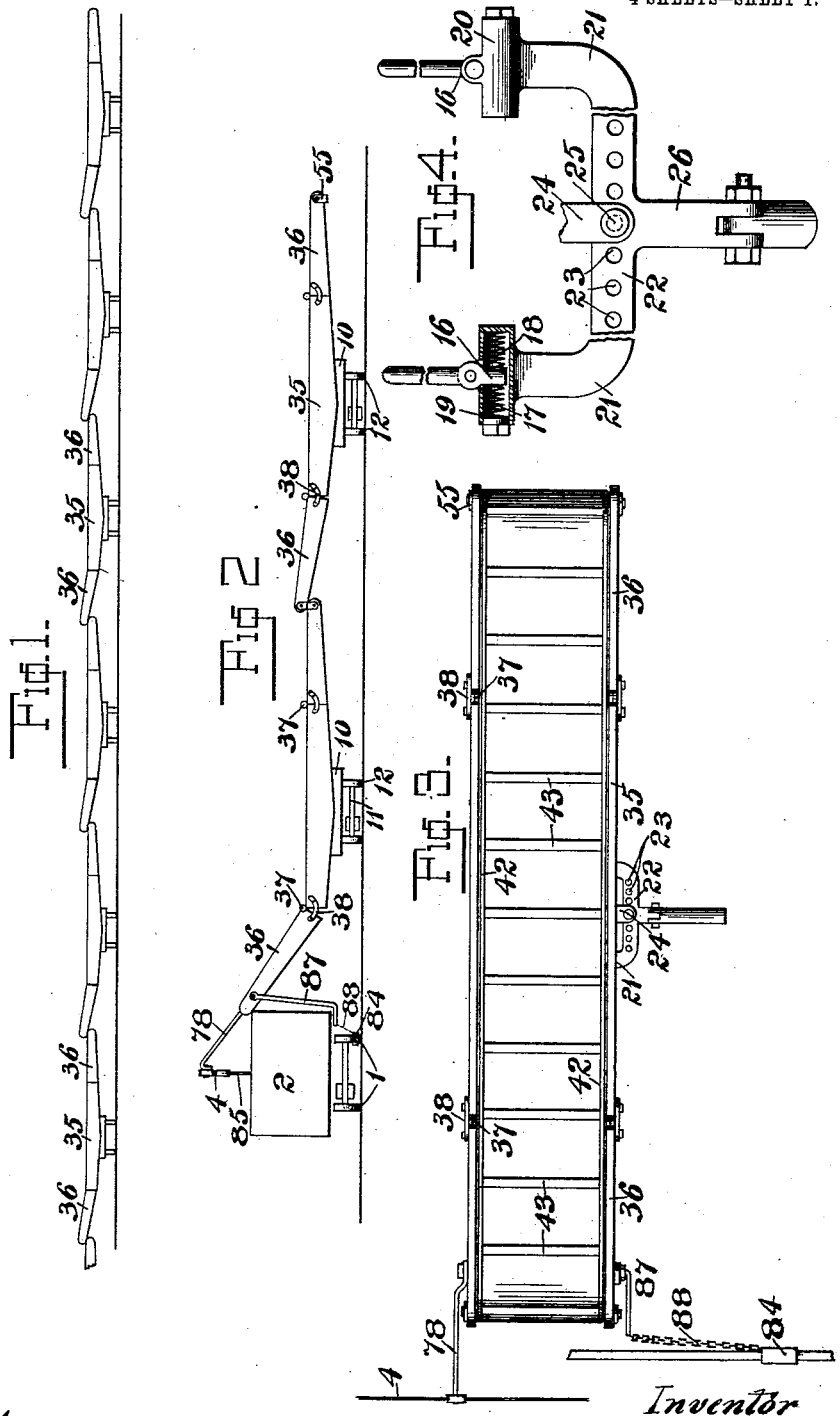

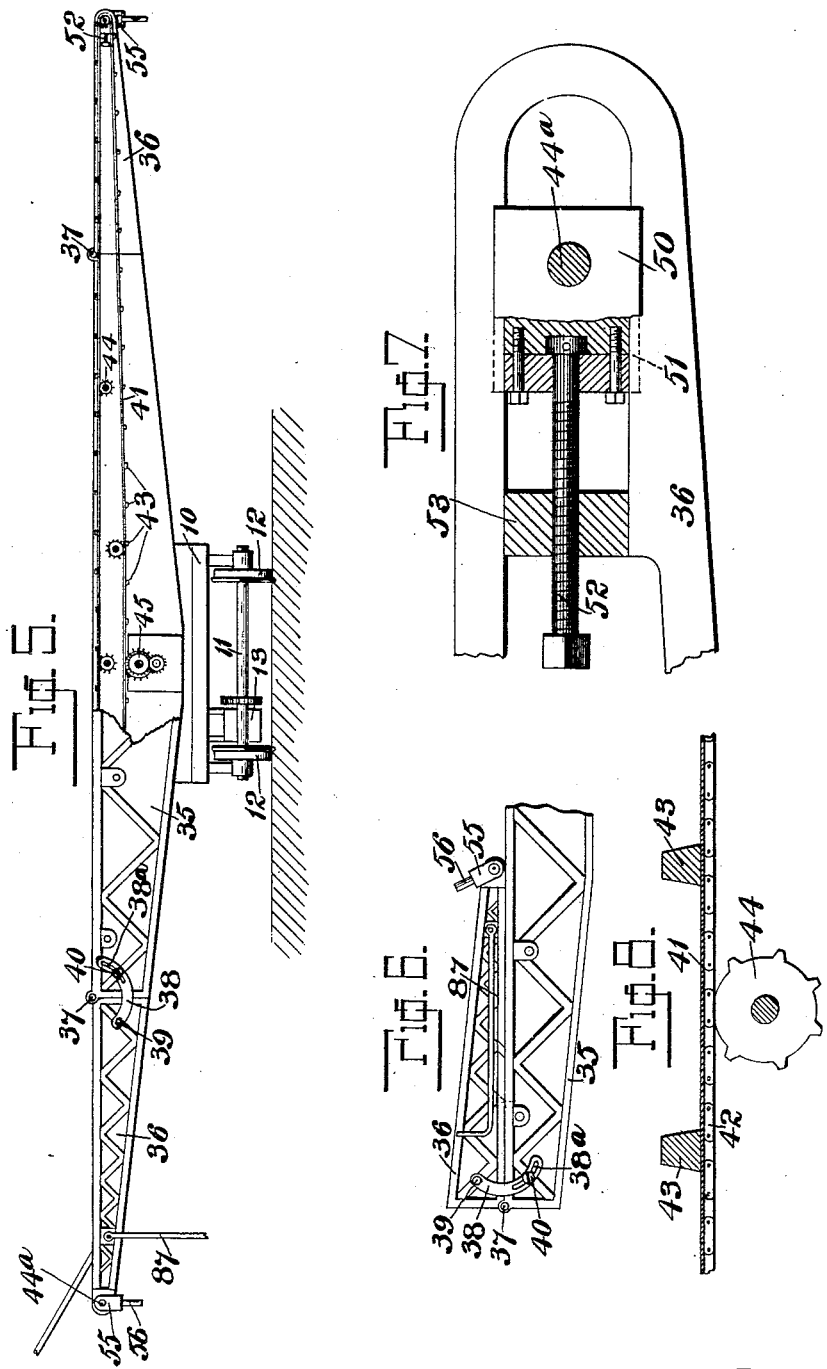

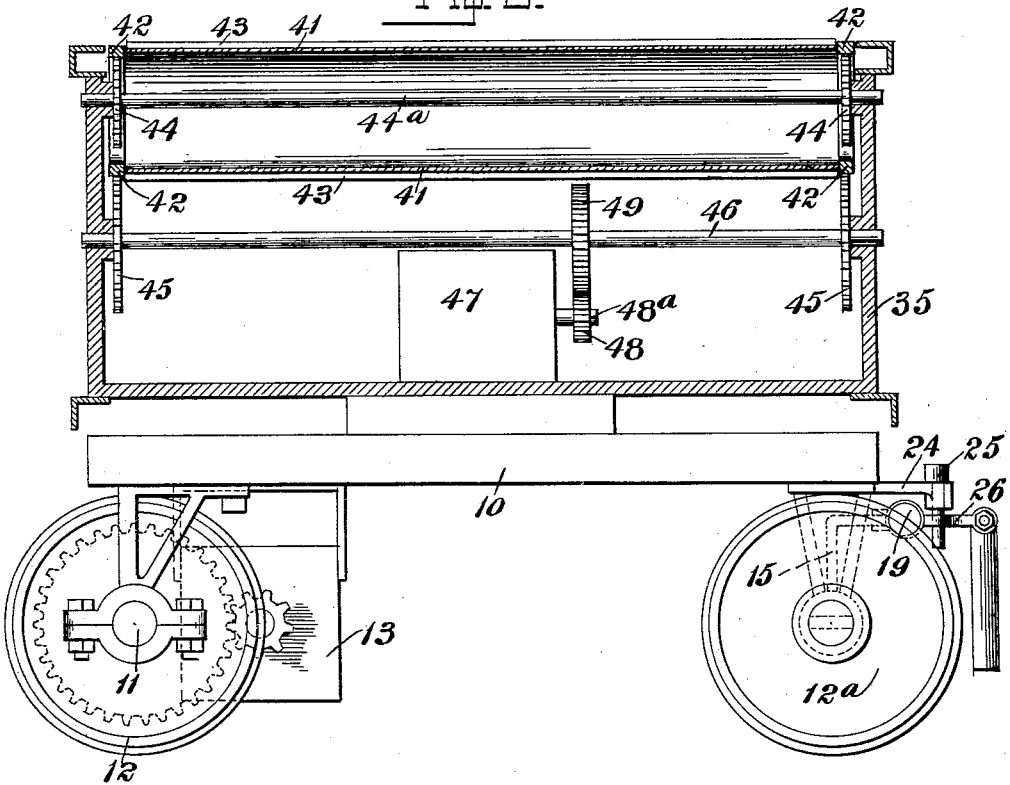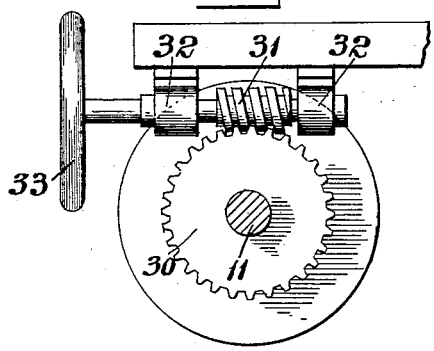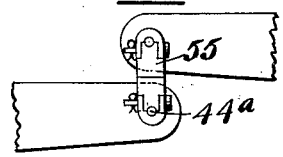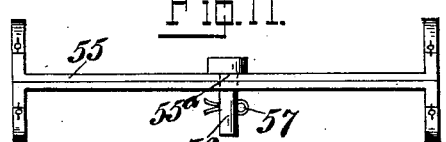

No. 745,821. PATENTED DEC. 1, 1903.
G. F. GREENWOOD.
CONVEYER.
APPLICATION FILED MAY 19, 1902.
NO MODEL. 4 SHEETS—SHEET 4.
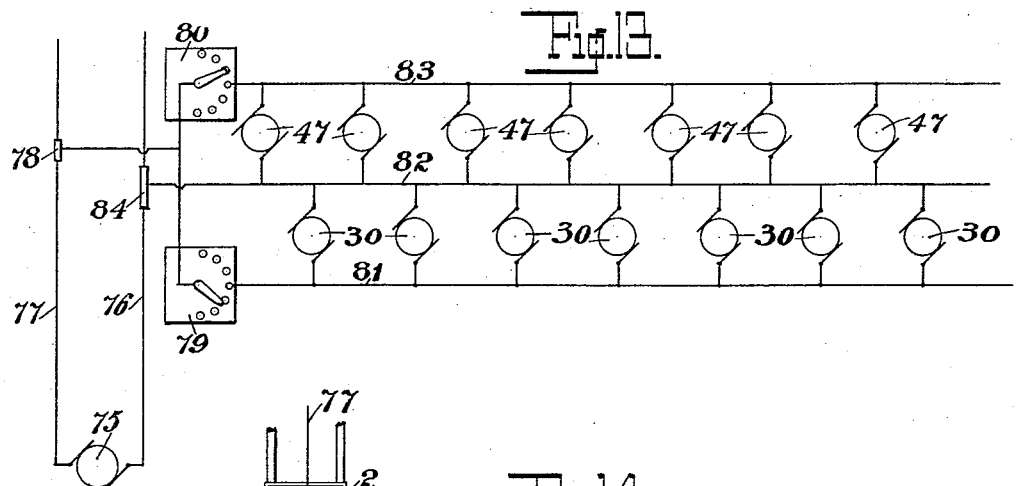
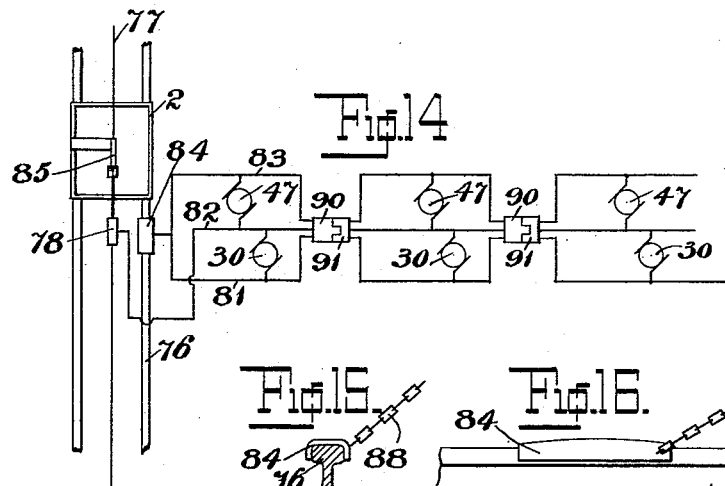
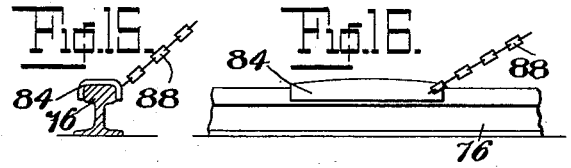
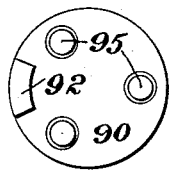
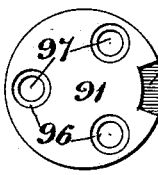
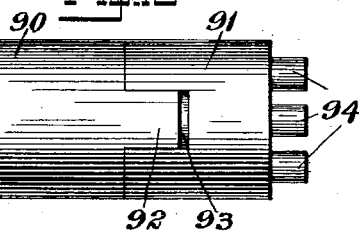
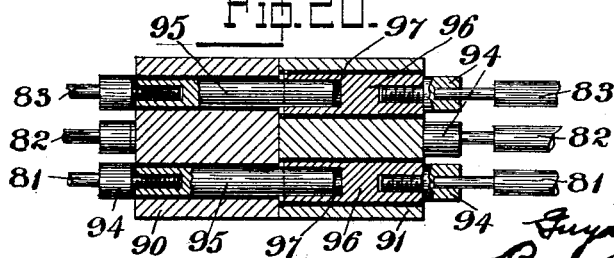
Witnesses
Inventor.

No. 745,821. Patented December 1, 1903.

UNITED STATES PATENT OFFICE.

GUYON F. GREENWOOD, OF MIDDLETOWN, NEW JERSEY.

CONVEYER.

SPECIFICATION forming part of Letters Patent No. 745,821, dated December 1, 1903.

Application filed May 19, 1902. Serial No. 108,048. (No model.)

*To all whom it may concern:*

Be it known that I, GUYON F. GREENWOOD, a citizen of the United States, and a resident of Middletown, in the county of Monmouth and State of New Jersey, temporarily located at Havana, Cuba, have invented certain new and useful Improvements in Conveyers for Agricultural Purposes, of which the following is a specification.

The object of my invention is to produce a conveyer for economically gathering all kinds of agricultural crops on large plantations and depositing the same into storage-houses or into receptacles or cars by which they are transferred in large quantities to storehouses.

Crops are now commonly gathered by means of wagons or carts which are filled by the laborers in the fields and transferred to the storehouses by draft-animals. This plan is objectionable on large plantations because the large number of laborers and draft-animals required for quickly gathering the crops in the proper seasons renders the operation very expensive. For instance, in gathering sugar-cane, sugar-beets, &c., in the southern countries the products are harvested by hand labor and loaded into ox-carts, from which they are transferred to larger wagons and conveyed to the storehouses—a very slow and expensive operation.

My invention comprises an agricultural conveyer made up of a plurality of independent conveyer units arranged in a series extending across the field from which the crops are to be gathered to a point where they are to be transferred to a car or suitable repository. These individual conveyer units are provided with independent means for propelling them over the field in a direction transverse to their feeding direction, and each conveyer unit is also provided with independent means for operating it. I prefer to provide a self-propelled car running upon a track for receiving the product from the sectional conveyer. The propelling means for said car consists, preferably, of an electric motor receiving current from a trolley-wire or other suitable source of electric supply. The independent propelling and conveyer-operating means mounted upon the several conveyer units are also preferably electric motors receiving current from the same source of electric supply. The independent conveyer units are flexibly and detachably connected so as to give freedom of movement relatively in all directions within certain limits and to enable the separation and interchange of the conveyer units. The conveyer may be made up of any number of the independent units to produce the desired length to suit the requirements of the field which is to be harvested.

In gathering crops with my improved sectional traveling conveyer I propose to advance the conveyer slowly or intermittently through the field, so as to follow the harvesters or laborers who gather the crop and deposit it upon the conveyer, the feeding movement of the conveyer units being uniform and continuous to transfer the crop to the receiving-car. The receiving-car is also intermittently propelled along its track to maintain its proper relation to the depositing end of the sectional traveling conveyer.

My invention comprises many other details for practically carrying out my plan for gathering agricultural crops, and in order that my invention may be fully understood I will first describe the same with reference to the accompanying drawings and afterward point out the novelty more particularly in the annexed claims.

In said drawings, Figure 1 is a side elevation representing, on a small scale, my improved sectional agricultural conveyer formed of a plurality of independent conveyer units. Fig. 2 is a similar view, on a larger scale, showing two of the conveyer units and the receiving-car into which the conveyer deposits the crops. Fig. 3 is a plan view of one of the conveyer units. Fig. 4 is a detail plan view illustrating the steering-gear for the wheeled vehicle of one of the conveyer units. Fig. 5 is a side elevation, on a larger scale, of one of the conveyer units, part being in section to show the conveyer belt and motor. Fig. 6 is a detail side elevation of one end of a conveyer unit, showing the end folded over for convenience in transporting. Fig. 7 is a detail sectional view illustrating the adjustable take-up for the endless traveling conveyer-band of a conveyer unit. Fig. 8 is a detail longitudinal sectional view illustrating the gearing between the independent motor and traveling belt. Fig. 9 is a transverse sectional view of one of the conveyer units, showing the wheeled supporting-truck in side elevation. Figs. 10 and 11 are detail views illustrating the means for mechanically and detachably connecting the adjacent ends of two conveyer units to allow a slight relative movement in any direction. Fig. 12 is a detail sectional view illustrating a modified form of independent device which may be employed for propelling each of the conveyer units through the field. Fig. 13 is a diagrammatic view illustrating an electric-circuit system which may be employed for operating the series of independent driving and propelling motors upon the plurality of conveyer units. Fig. 14 is a similar view illustrating the same circuits more in detail and also the three-wire electric couplings which connect the individual conveyer units. Figs. 15 and 16 are respectively a detail transverse sectional view and a detail side elevation of the rail contact-shoe for the return-circuit of the motors of the conveyer units. Figs. 17, 18, 19, and 20 are detail views of the three-wire electric coupling which connects the circuit-wires of the independent conveyer units.

1 represents a suitable car-track which is preferably one of a series of branch lines which extend through a plantation at proper distances apart to conveniently carry out my plan for gathering crops. Upon this track 1 travels a self-propelled car 2, preferably an electric car having a propelling-motor 3, which receives current from a trolley supply-wire 4, the electric circuit being completed through the track.

Coöperating with the self-propelled car 2 or other suitable stationary or traveling repository I employ a sectional mobile conveyer consisting of a plurality of independent conveyer units, which are adapted to be arranged approximately end to end or in a longitudinal series extending approximately transversely to the trolley-track 1. Each conveyer unit is mounted upon a wheeled vehicle, the wheels of which are mounted upon axles extending parallel with the direction of feed of the conveyers, so as to enable the conveyer to progress through the field approximately parallel with the trolley-track or transversely with relation to the direction of feed of the conveyers.

I will first describe in detail one of the conveyer units and then explain the coöperation of the independent conveyer units and the manner of using the sectional conveyer.

10 is the running-gear of a suitable vehicle mounted upon axles 11, carrying the traction and supporting wheels 12 12$^a$. An electric motor 13 is suitably supported upon the running-gear 10 and is geared to one of the axles 11 for propelling the vehicle. The front wheels 12$^a$ are preferably arranged in the form of caster-wheels, with their vertical stems or axles 15 formed with forwardly-projecting fingers 16, which are engaged upon opposite faces by spiral springs 17 and 18, confined in the cylindrical boxes 19 and 20 on the steering-frame 21, which is of yoke shape. The two arms of the steering-frame 21 are journaled upon the centers of the spindles 15, so that when the yoke is moved to one side or the other the caster-wheels will be accordingly deflected from their central position. The springs 17 and 18 allow any slight deflections of the caster-wheels caused by encountering obstructions in the field, and at the same time said springs maintain the caster-wheels normally in their adjusted position for maintaining the desired direction of the conveyer-vehicle through the field. The central bar 22 of the yoke 21 is formed with a series of holes 23. A rigid arm 24 projects forwardly from the running-gear 10 of the vehicle and carries a centering-pin 25, which may engage in one of the holes 23 for maintaining the steering-frame in the desired adjusted position. An arm or handle 26 projects forwardly from the steering-yoke to facilitate its adjustment.

The wheels 12 12$^a$ are preferably flanged wheels, as shown, for two reasons. The flanges will insure the vehicles being propelled in a straight course, and when it is desired to transport the conveyer units from one part of a plantation to another they can be placed upon the trolley-track and coupled up electrically or mechanically and run to the desired point.

Any suitable means may be provided for propelling the conveyer-vehicle through the field to be harvested. I prefer to provide each conveyer-vehicle with an electric motor, such as 13, above referred to. I have not attempted to illustrate the specific structure of the motor nor the means for gearing it to the vehicle-axle. Any approved form of motor and gearing may be employed.

In place of the electric motor for propelling the conveyer-vehicles I may provide other forms of propelling means—such, for instance, as is illustrated in Fig. 12 of the drawings, in which a worm-gear 30 is keyed to the vehicle-axle 11 and meshes with a driving-worm 31, journaled in bracket-bearings 32 and carrying a hand-wheel 33 at its outer end. The operators can propel the vehicles intermittently by these hand-operated mechanisms to cause the conveyers to follow sufficiently close to the laborers.

Each conveyer-vehicle supports an elongated conveyer-frame, which is formed, preferably, of three hinged sections and extends parallel with the vehicle-axles. The central section 35 of each conveyer is rigidly mounted upon the running-gear of the vehicle, while the end sections 36 are hinged at 37 to the opposite ends of the central section. Slotted plates, such as 38, are pivoted to the outer sections 36 at 39 adjacent to hinges 37, and screws or bolts 40 pass through the slots 38$^a$ of plates 38 and are threaded into the section 35 to securely lock the plates 38 in the desired adjusted position. By this or other suitable means the movable outer sections 36 may be secured in any desired angular relation to the central section 35.

41 is the conveyer-belt, formed of canvas or other suitable flexible material. This web or belt of flexible material is mounted at its edges upon suitable sprocket-chains 42 and carries the spaced cross-slats 43. The sprocket-chains 42 of the belt 41 travel around and are supported upon the sprocket-wheels 44, which are mounted upon the transverse shafts 44$^a$, which are suitably journaled in the sectional conveyer-frame 35 36. The traveling belt is driven by means of the driving sprocket-wheels 45, which are mounted upon the driving-shaft 46, journaled centrally in the conveyer-frame section 35, said shaft carrying a gear-wheel 49, which meshes with a driving-gear 48 upon the armature-shaft 48$^a$ of an electric motor 47. The motor 47 is suitably mounted upon the central conveyer-frame section 35 and receives electric current through the circuit-wires under the control of the controller, as hereinafter explained.

Each conveyer-section is preferably provided with a belt-tightening device, as shown in Fig. 7 of the drawings, to maintain the conveyer-belt in properly-stretched condition. This belt-tightening device may be of ordinary construction, as shown, in which one of the sprocket-wheel-supporting shafts 44$^a$ is journaled in adjustable blocks 50, which slide in ways 51 of one of the outer conveyer-frame sections 36 and is engaged by adjusting-screws 52, threaded through blocks 53.

55 is a metal yoke which is freely journaled upon the extended ends of the shafts 44$^a$ at the extreme outer ends of the conveyer-frame sections 36. These yokes 55 are capable of free movement upon the shafts 44$^a$. Each yoke 55 has a central pivot-opening 55$^a$, adapted to receive headed pivot-bolt 56, provided with a cotter-pin 57. The yokes 55 are for the purpose of mechanically connecting the adjacent ends of the conveyer-sections when they are arranged end to end to form a sectional conveyer as contemplated by my invention. The adjacent conveyer units are flexibly coupled by passing the pivot-bolts 56 through the pivot-openings 55$^a$ of the yokes of the adjacent ends of the conveyer units and inserting the cotter-pin 57 for holding the pivot-pin in place. It will be observed particularly by referring to Fig. 11 of the drawings that sufficient space is allowed between the cotter-pin 57 and head of the pivot-bolt 56 to afford ample vertical play between the pivotally-connected yokes. This allows for any relative vertical vibrations of the conveyer units. The pivotal connection between the yokes allows any relative lateral play between the connected conveyer units. This flexible mechanical connection between the conveyer-sections is necessary because of the independent propulsion of the conveyer-sections and the unevenness of the ground over which the sectional conveyer must pass.

In Figs. 13 and 14 of the drawings I have represented an electric-circuit system for supplying electricity to the series of independent belt-driving and vehicle-propelling motors carried by the independent conveyer units. In said figures, 75 represents a generator; 76, the track-rails; 77, the trolley-wire; 78, the current-supplying trolley for the conveyer-motors; 79, the controller for the vehicle-propelling motors 30; 80, the controller for the belt-driving motors 47; 81, 82, and 83, the circuit-wires, including the independent motors in multiple, and 84 the contact-shoe connecting the return-wire 82 with one of the track-rails 76. The controllers 79 and 80 may be of any approved construction. These controllers are represented diagrammatically in the form of the ordinary starting-boxes. The electric car 2 receives current from the trolley-wire 77 through the trolley 85. The contact-shoe 84 for the return-current of the conveyer-motors is preferably in the form shown in Figs. 15 and 16, in which it fits loosely over the track-rail 76 and is tapered from its center toward its ends to facilitate the passage of the car 2 thereover when the car is run up into position to receive material from the conveyer. In addition to the electric connection of the shoe 84 with the circuit return-wire 82 I prefer to connect the shoe with an arm 87, which is adapted to be suitably secured to one of the conveyer-sections, the connection between the arm and the shoe being represented in the form of a chain 88.

To facilitate the coupling up of the circuit-wires of the several independent conveyer units, I prefer to provide some suitable electric coupling. For the three-wire system illustrated and above described I may employ the electric coupling shown in Figs. 14, 17, 18, 19, and 20 of the drawings. The coupling shown comprises two cylindrical shells or sections 90 91, formed, respectively, with a tongue or projection 92 and a recess or socket 93, which fit one within the other to determine the proper coupling relation of the sections. The three circuit-wires 81, 82, and 83 are electrically connected with the terminals 94 of the coupling-sections. The terminals 94 of coupling-section 90 are connected with the rods or stems 95, which extend through and are suitably insulated within the coupling-ring and project beyond the inner face of the coupling-section 90, while the terminals 94 of section 91 are connected with the insulated cores 96, formed with the stem-receiving sockets 97. In joining the coupling-sections 90 and 91 the projecting stems 95 will be forced into the sockets 97 of cores 96, thereby properly connecting up the circuit-wires 81, 82, and 83 of the individual conveyer units.

When it is desired to transfer the sectional conveyer from one location to another, the conveyer units are uncoupled electrically and mechanically, and the hinged outer sections 36 of each conveyer unit are folded over onto the central rigid conveyer-section 35, as shown in Fig. 6 of the drawings. This collapsed position of the conveyer units reduces their dimensions very materially and renders them more convenient for moving from place to place. As stated above, the flanged wheels of the conveyer-vehicles adapt the conveyer units to run upon the trolley-track.

When it is desired to gather the crops from a field with my improved sectional conveyer, a sufficient number of the conveyer units is arranged with the conveyer-vehicles parallel and the conveyer-belt extending approximately end to end or longitudinally and at right angles to the vehicles. The ends of the conveyer units are coupled up, as above described. Having arranged the receiving-car in proper relation at one end of the sectional conveyer, the laborers proceed to gather the crops and deposit them upon the traveling conveyer-belts. The conveyer-belt controller is set to drive the several independent belt-driving motors at the proper speed, and the crops will be transferred from one conveyer unit to another until they are finally deposited in the receiving-car. As the laborers proceed through the field the operator gradually advances the sectional conveyer to follow them close enough for convenience. When the car has been filled with the material gathered, the operation is arrested until another car is run into place, when the operation may be continued as before.

With my improved sectional conveyer I am able to gather the crops from a large plantation with greater economy and more rapidly than has heretofore been possible by other means known to me.

It may sometimes prove desirable upon large plantations to operate two of my improved sectional conveyers through a field extending between two lines of tracks, in which case the two conveyers will progress through the field in the same direction and will feed the gathered crop in opposite directions to two receiving-cars.

Many of the details of construction of my improved sectional conveyer may be modified without departing from the spirit of my invention, and I would have it understood that I do not intend to limit myself to any of the details of construction, except in those claims in which the details are specifically pointed out.

I desire to claim, broadly, a conveyer comprising a plurality of independent conveyer units each carrying its own actuating mechanism, arranged to act successively for transferring material from one point to another. I also desire to claim, broadly, such a sectional conveyer in combination with a track and a car traveling upon said track and adapted to receive material from the conveyer.

Having thus described my invention, the following is what I claim as new therein and desire to secure by Letters Patent:

1. In a machine of the character described, the combination with a vehicle, of a conveyer comprising a plurality of independent units movable relatively to the vehicle, and constructed to receive and convey crops from a field to said vehicle, and means to advance said conveyer on the field as the gathering of the crops advances.

2. In a machine of the character described, the combination with means for conveying crops in one direction, and a conveyer comprising a plurality of independent units for conveying the crops to the first means, extending transversely thereto, and movable longitudinally relatively thereto.

3. The combination of a track, and a car traveling upon said track, with a conveyer independent of the track and the car comprising a plurality of independent units extending transversely to said track and adapted to travel approximately parallel with said track and convey material to said car, substantially for the purposes specified.

4. The combination of a track, and a car traveling upon said track, with a conveyer independent of the track and the car comprising a plurality of independent units extending transversely to said track and adapted to convey material to said car, and means for propelling said conveyer to cause it to travel approximately parallel with said track, substantially for the purposes specified.

5. The combination of a track and a self-propelled car traveling upon said track, with a self-propelled conveyer independent of the track and the car extending transversely to said track and adapted to travel approximately parallel with said track and convey material to said car, substantially for the purposes specified.

6. The combination of a track, and a car traveling upon said track, with a conveyer independent of the track and the car comprising a plurality of independent units extending transversely to said track and adapted to travel approximately parallel with said track, and means for operating the conveyer to cause it to convey material to said car, substantially for the purposes specified.

7. The combination of a track, a car traveling upon said track, and means for propelling said car, with a vehicle independent of the track and the car comprising a plurality of independent units adapted to travel approximately parallel with said track, a conveyer mounted upon and extending transversely of said vehicle and adapted to convey material to said car, and means for operating said conveyer, substantially as set forth.

8. The combination of a track, a car traveling upon said track, and means for propelling said car, with a vehicle independent of the track and the car comprising a plurality of independent units adapted to travel approximately parallel with said track, an endless conveyer mounted upon said vehicle and extending transversely thereof and adapted to convey material to said car, and independent means for operating said endless conveyer, substantially as set forth.

9. The combination of a track, a car traveling upon said track, an electric motor upon said car for propelling it, and a suitable supply for electricity, with a vehicle independent of the track and the car arranged to travel approximately parallel with said track, an electric motor mounted upon and adapted to propel said vehicle, a conveyer mounted upon and extending transversely of said vehicle and adapted to convey material to said car, an independent electric motor for driving said conveyer, and means connecting said motors with the electric supply, substantially as set forth.

10. A conveyer comprising a series of independent conveyer units each carrying its own actuating mechanism arranged to coöperate for transferring material from one point to another, substantially for the purposes specified.

11. A conveyer comprising a series of independent self-propelled conveyer units arranged to coöperate for transferring material from one point to another, substantially for the purposes specified.

12. A conveyer comprising a series of independent self-propelled conveyer units, and means for operating said conveyer units in unison, substantially for the purposes specified.

13. A conveyer comprising a series of independent conveyer units adapted to progress transversely to their direction of feed, means for operating the conveyer units, and means for propelling the conveyer units, substantially for the purposes specified.

14. A conveyer comprising a series of independent electrically-operated conveyer units, mechanical and electrical means connecting said units, and means for propelling the conveyer units transversely to the direction of feed, substantially for the purposes specified.

15. The combination of a plurality of independently-operated conveyer units, means for advancing said conveyer units transversely to their direction of feed, and a receptacle arranged to receive material conveyed by said conveyer units, substantially for the purposes specified.

16. The combination of a plurality of independently-operated conveyer units, means for advancing said conveyer units transversely to their direction of feed, and a self-propelled car or traveling receptacle arranged to receive material conveyed by said conveyer units, substantially as set forth.

17. The combination of a plurality of independently-operated conveyer units, means for independently advancing said conveyer units transversely to their direction of feed, and a car arranged to receive material from said conveyer units and having propelling means adapted to propel it parallel with the advancing movement of said conveyer units, substantially as set forth.

18. The combination of a plurality of vehicles, independent means for propelling each of said vehicles, an independent endless conveyer mounted upon and extending transversely of each of said vehicles, independent means for operating each of said conveyers, and a car arranged to receive material from said plurality of endless conveyers and having means adapted to propel it approximately parallel with the direction of advancement of the vehicles, substantially as set forth.

19. The combination of a plurality of vehicles, independent means for propelling each of said vehicles, an independent endless conveyer mounted upon and extending transversely of each of said vehicles, mechanical means flexibly connecting the adjacent ends of said conveyers, independent means for driving each of said conveyers, and a car arranged to receive material from said conveyers and having propelling means adapted to propel it approximately parallel with the direction of advancement of said vehicles, substantially as set forth.

20. The combination of a plurality of vehicles, independent means for propelling each of said vehicles, means for operatively connecting all of said independent propelling means, an independent endless conveyer mounted upon and extending transversely of each of said vehicles, said conveyers being arranged in a longitudinal series, mechanical means flexibly connecting the adjacent ends of said endless conveyers, independent means for driving each of said conveyers, means coupling the independent driving means of the conveyer, a car arranged to receive material from said endless conveyers and having suitable propelling means, and a common source of power operatively communicating with the propelling means of the vehicles, the driving means of the conveyers, and the propelling means of the car, substantially as set forth.

21. The combination of a plurality of independent vehicles arranged to travel in parallel lines, independent propelling means for each of said vehicles, an independent endless conveyer mounted upon and extending transversely of each of said vehicles, independent means for driving each of said conveyers, means for operatively connecting the independent driving means of said conveyers, mechanical means for flexibly connecting the adjacent ends of said conveyers, and a car arranged to receive material from said conveyers and having means for propelling it approximately parallel with the direction of movement of said vehicles, substantially as set forth.

22. The combination of a plurality of vehicles, an independent electric motor mounted upon and adapted to drive each of said vehicles, an endless conveyer mounted upon and extending transversely of each of said vehicles, an independent electric motor arranged to drive each of said conveyers, said conveyers being arranged in line and adapted to operate successively upon material to be conveyed from one point to another, a source of electric supply, electric circuits connecting all of said independent motors with the electric supply, and a car arranged to receive the material from said series of conveyers and having means for propelling it, substantially as set forth.

23. The combination of a series of endless conveyers arranged approximately end to end and adapted to feed from one to another, means for driving said conveyers, and means for advancing said series of conveyers transversely to the direction of feed, substantially for the purposes specified.

24. The combination of a series of endless conveyers arranged approximately end to end and adapted to feed from one to another, independent means for driving each of said conveyers, and independent means for advancing each of said conveyers to cause the series of conveyers to advance transversely of the direction of feed, substantially for the purposes specified.

25. The combination of a series of endless conveyers arranged approximately end to end and adapted to feed from one to another, independent means for driving each of said conveyers, independent means for advancing each of said conveyers to cause the series of conveyers to advance transversely of the direction of feed, means operatively connecting the independent driving means of the conveyers, and means operatively connecting the independent advancing means of the conveyers, substantially for the purposes specified.

26. The combination of a longitudinally-arranged series of endless conveyers adapted to successively act upon material to be transferred from one point to another, means for operating said conveyers, and means for advancing said series of conveyers in a direction transverse to their direction of feed, substantially for the purposes specified.

27. The combination of a longitudinally-arranged series of endless conveyers adapted to successively act upon material to be transferred from one point to another, means for operating said conveyers in unison, and means for simultaneously advancing all of the conveyers of the series, in a direction transverse to their direction of feed, substantially for the purposes specified.

28. The combination of a longitudinally-arranged series of endless conveyers adapted to successively act upon material to be transferred from one point to another, means for operating said conveyers, means for advancing said series of conveyers in a direction transverse to their direction of feed, a car adapted to receive material from said series of conveyers, and means for advancing said car parallel with the advancing direction of the series of conveyers, substantially for the purposes specified.

29. The combination of a car having means for propelling it, with a series of endless conveyers arranged approximately end to end and extending transversely of the direction of movement of the car and adapted to convey material to the car, means for operating said endless conveyers, and means for advancing said series of endless conveyers in a direction parallel with the direction of movement of the car, substantially as set forth.

GUYON F. GREENWOOD.

Witnesses:
DAVID GRANT,
M. G. HUBBARD.